United States Patent
Lauwers

(10) Patent No.: US 8,360,926 B2
(45) Date of Patent: Jan. 29, 2013

(54) COMPACT TRANSMISSION COMPRISING A PLANETARY GEAR SET

(76) Inventor: Leonardus Gijsbertus Cornelis Lauwers, Nieuwerkerk a/d IJssel (NL)

( * ) Notice: Subject to any disclaimer, the term of this patent is extended or adjusted under 35 U.S.C. 154(b) by 219 days.

(21) Appl. No.: 12/995,117

(22) PCT Filed: May 29, 2009

(86) PCT No.: PCT/NL2009/000124
§ 371 (c)(1),
(2), (4) Date: Jan. 4, 2011

(87) PCT Pub. No.: WO2009/145616
PCT Pub. Date: Dec. 3, 2009

(65) Prior Publication Data
US 2011/0136613 A1    Jun. 9, 2011

(30) Foreign Application Priority Data
May 29, 2008    (NL) ...................................... 2001629

(51) Int. Cl.
*F16H 3/44* (2006.01)
(52) U.S. Cl. ........................ 475/322; 475/320
(58) Field of Classification Search .................. 475/317, 475/320–322; 192/18 A, 18 R; 188/71.5, 188/167
See application file for complete search history.

(56) References Cited

U.S. PATENT DOCUMENTS

| 3,044,320 | A | | 7/1962 | Francois |
|---|---|---|---|---|
| 3,563,114 | A | * | 2/1971 | Casale .......................... 475/328 |
| 4,750,384 | A | | 6/1988 | Belliveau |
| 4,860,615 | A | * | 8/1989 | Huber et al. .................. 475/143 |
| 5,307,910 | A | * | 5/1994 | Im ................................ 192/13 R |
| 7,537,536 | B2 | * | 5/2009 | Hvolka et al. ................ 475/146 |

FOREIGN PATENT DOCUMENTS

| DE | 205522 | 1/1909 |
|---|---|---|
| FR | 1134821 | 4/1957 |
| LU | 42056 | 9/1962 |
| WO | WO 02/40900 | 5/2002 |

* cited by examiner

*Primary Examiner* — David D Le
*Assistant Examiner* — Huan Le

(57) ABSTRACT

A transmission has a housing and two input/output shafts. Inside the housing is a planetary gear set with three rotatable members which are connected to the housing and the two input/output shafts. Inside the housing is a clutch which can connect two out of three of the rotatable members. When the clutch is closed the input/output shafts are connected together one to one. The pressure plate of the clutch is connected to a brake disc of a brake system that is connected to one of the rotatable members. When the brake system is closed the input/output shafts are connected via the planetary gear set. The transmission further includes a lever which can move the brake disc in axial direction and can thus open the clutch during operation.

6 Claims, 3 Drawing Sheets

COMPACT TRANSMISSION COMPRISING A PLANETARY GEAR SET

FIELD OF THE INVENTION

The invention relates to a transmission comprising a first input/output shaft, a second input/output shaft, a planetary gear set comprising three rotatable members of which a first rotatable member is connected to the first input/output shaft and a second rotatable member is connected to the second input/output shaft, which transmission further includes a clutch having a first clutch portion which is connected to one of the rotatable members, a second clutch portion which is connected to another one of the rotatable members and is axially movable relative to the first clutch portion, and an axially movable pressure plate, and which transmission includes a brake with a brake disc that is fixedly attached to the pressure plate and at least one brake pad fixedly connected to the firm object in the direction of rotation of the brake disc and movably connected to the firm object in axial direction of the brake disc, the brake disc being movably connected in axial direction to a third one of the rotatable members and being fixedly connected in the direction of rotation to a third one of the rotatable members.

STATE OF THE ART

A transmission of this type is known from FR-A-1.134.821. This known transmission has a gear reduction between the two input/output shafts determined by the indirect couplings if the brake is closed and a direct coupling between the two input/output shafts if the clutch is closed. When the brake is closed the clutch is opened at the same time, so that the two can never be closed together. The known transmission takes up relatively much space. In addition, with the known transmission it is impossible to switch during operation because then the transmission utilizes two gears and is consequently blocked.

SUMMARY OF THE INVENTION

It is an object of the invention to provide a transmission of the type set out in the opening paragraph which is more compact than the known transmission. For this purpose the transmission according to the invention is characterised in that the transmission includes a housing in which the planetary gear set and the clutch are arranged while the third rotatable member is attached to the housing. As a result, a compact construction is obtained. Since the housing can be sealed in a simple manner by means of sealing rings between the input/output shafts and the housing, the planetary gear set can be lubricated in a simple manner and/or the clutch can be arranged as a wet plate clutch. In addition, the oil baths of various mutually coupled transmissions can be coupled to each other in a simple manner.

An embodiment of the brake disc according to the invention is characterised in that the brake disc is situated at a distance from an axial side of the housing, while a brake disc side turned away from the housing forms a braking surface that cooperates with the brake pad and the other axial side of the housing forms a further braking surface, and the brake includes a further brake pad that cooperates with the further braking surface. In consequence, a robust construction of the brake is obtained that requires little additional space.

A further embodiment of the brake disc according to the invention is characterised in that the transmission comprises disengaging means which are capable of axially displacing the brake disc and thus pushing away the pressure plate of the clutch portions and opening up the clutch. As a result, the transmission can also be transited to a state where the two input/output shafts are disengaged.

Yet a further embodiment of the brake disc according to the invention is characterised in that the disengaging means comprise a lever that is rotatable around a pivot which is bearing-mounted on the housing, one end of which lever can be operated and the other end is bearing-mounted on the brake disc. As a result of this construction the two input/output shafts can be disengaged even during operation.

BRIEF DESCRIPTION OF THE DRAWINGS

The following description relating to the appended drawings, the whole given by way of non-limiting example of the transmission according to the invention, will provide better understanding of how the invention can be realised, in which.

DETAILED DESCRIPTION OF THE DRAWINGS

Figure 1:
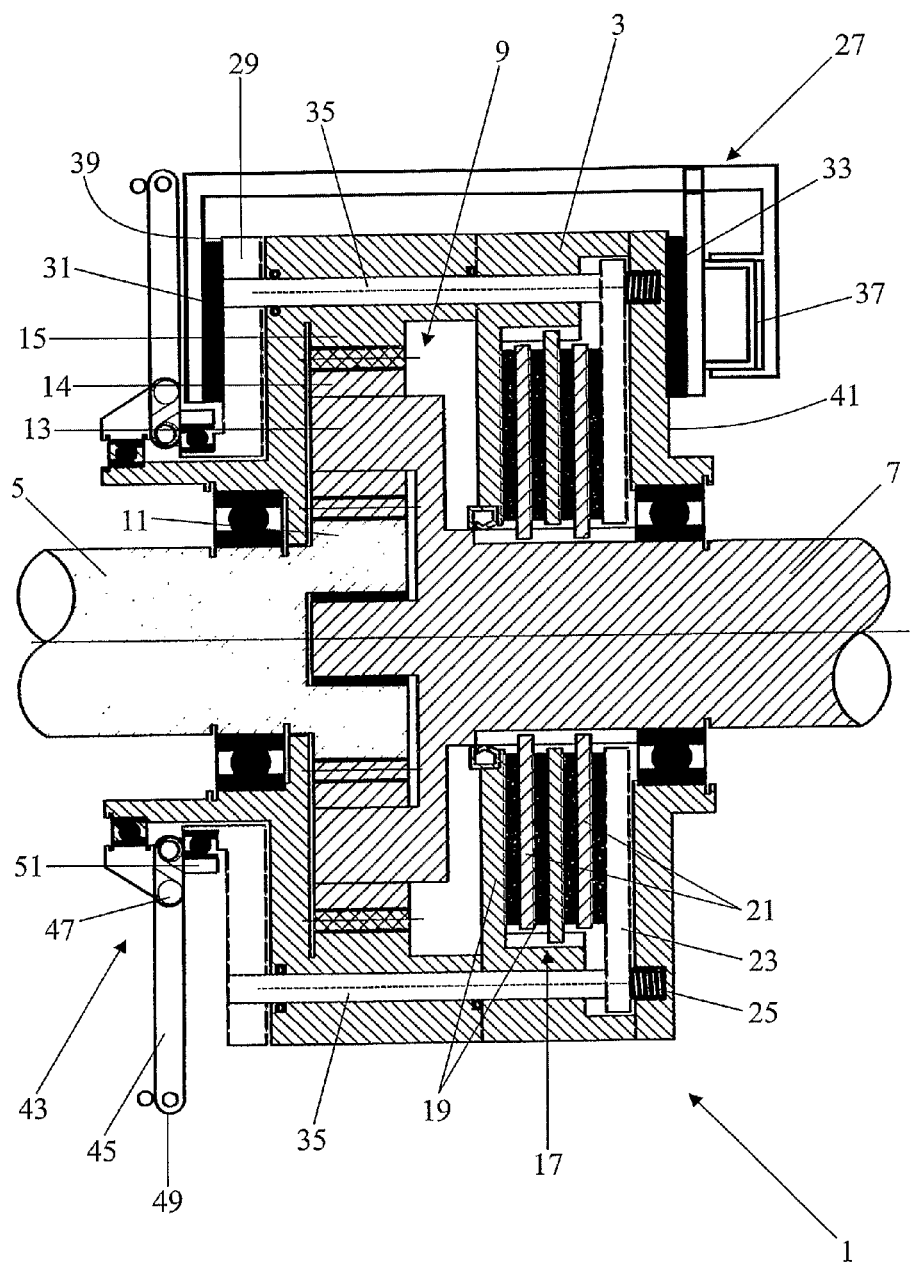
FIG. 1 shows a first embodiment of the transmission according to the invention.

FIG. 1 shows a sectional view of a first embodiment of the transmission according to the invention. The transmission 1 comprises a housing 3 and two input/output shafts 5, 7, while in a bore in the first end of the first input/output shaft 5 is arranged a shaft head-end attached to the end of the second input/output shaft 7. Inside the housing 3 there is located a planetary gear set 9 having three rotatable members which are formed by a sun gear 11, a planet gear support 13 with planet gears 14 thereon, and an annulus gear 15. The sun gear 11 is connected to the first input/output shaft 5, the planet gear support 13 is connected to the second input/output shaft 7, and the annulus gear 15 is rigidly connected to the housing 3.

The housing further accommodates a clutch 17 of which a first clutch portion 19 is connected by means of the housing 3 to the annulus gear 15, and a second clutch portion 21 is connected by means of the second input/output shaft 7 to the planet gear support 13. The first clutch portion 19 is constituted by a wheel attached to the housing and a further wheel axially movable relative to the housing and fixed to the housing in the direction of rotation. The second clutch portion 21 is constituted by two clutch discs which are axially movable relative to the second input/output shaft and are fixedly attached to the second input/output shaft 7 in the direction of rotation. One of the clutch discs is present between the two wheels of the first clutch portion 19 and the other clutch disc is present between the movable disc and an axially movable pressure plate 23 of the clutch. This pressure plate 23 is pressed down by springs 25 and presses the clutch plates and wheels together.

The transmission 1 further includes a brake 27 with a brake disc 29 and two brake pads 31 and 33 connected to the firm object. The brake disc 29 is present at a distance beside an axial side of the housing 3 and fixedly fitted to the pressure plate 23 by means of rods 35. The brake pads 31, 33 can be pushed against a side 39 of the brake disc 29 and a side 41 of the housing 3 by means of a hydraulic cylinder 37. These sides 39 and 41 then constitute braking surfaces. The brake disc is movable in axial direction and is fixedly fitted to the annulus gear 15 in the direction of rotation.

The transmission 1 further includes disengaging means 43 which are capable of moving the brake disc 29 in axial direction and thus pushing away the pressure plate 23 of the clutch means 19 and 21 and opening up the clutch 17. These disengaging means 43 have a lever 45 which can rotate around a pivot 47 which is bearing-mounted on the housing 3. The free end 49 of the lever can be operated and the other end 51 is bearing-mounted on the brake disc 29. The lever 45 does not rotate relative to the firm object and can thus be operated in a simple manner during functioning while this lever, via the brake plate 29, pushes the pressure plate 23 away from the two clutch portions 19 and 21 against the force of the springs 25 and thus opens up the clutch 17.

Figure 2:
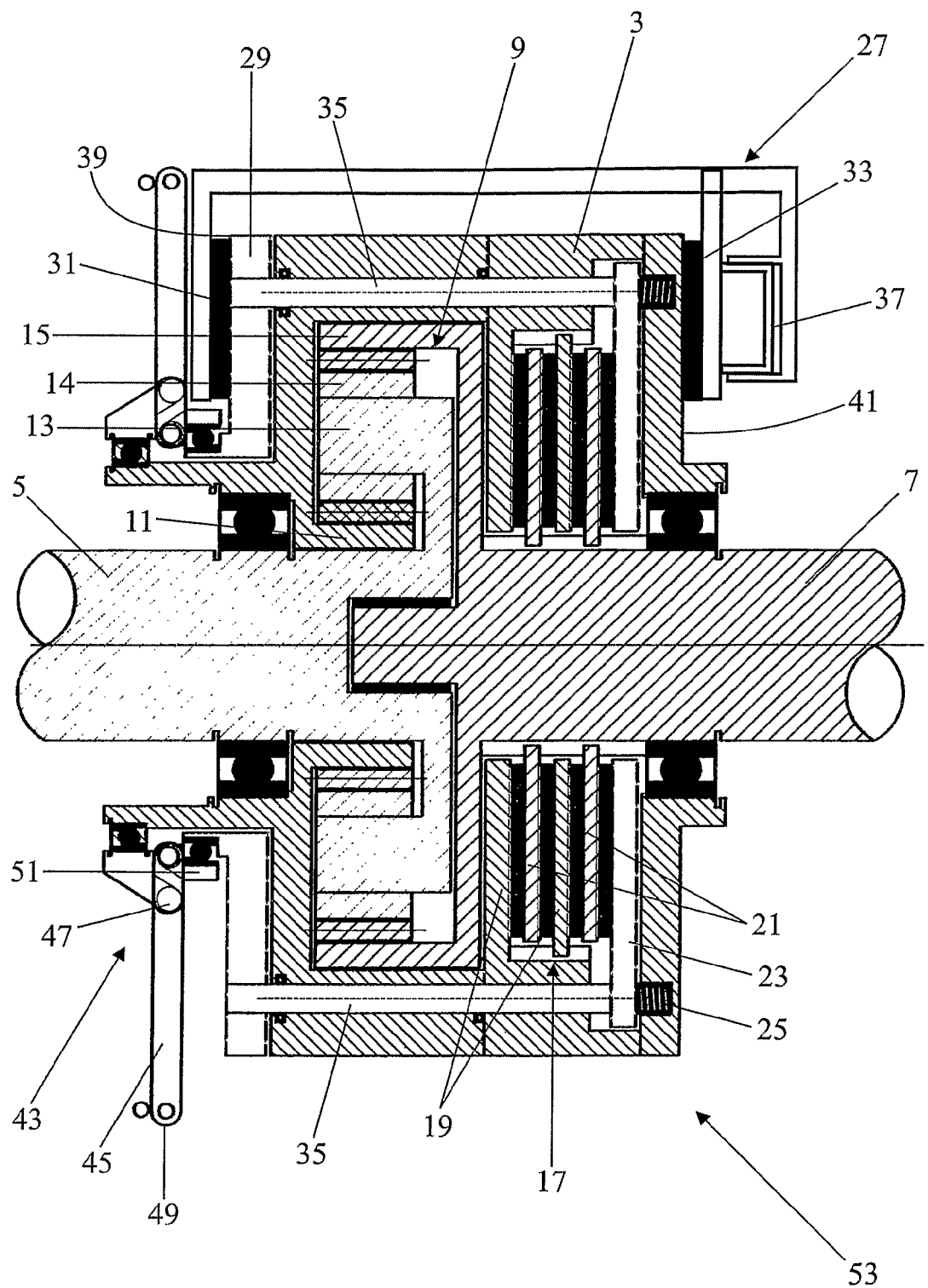
FIG. 2 shows a second embodiment of the transmission according to the invention.
Figure 3:
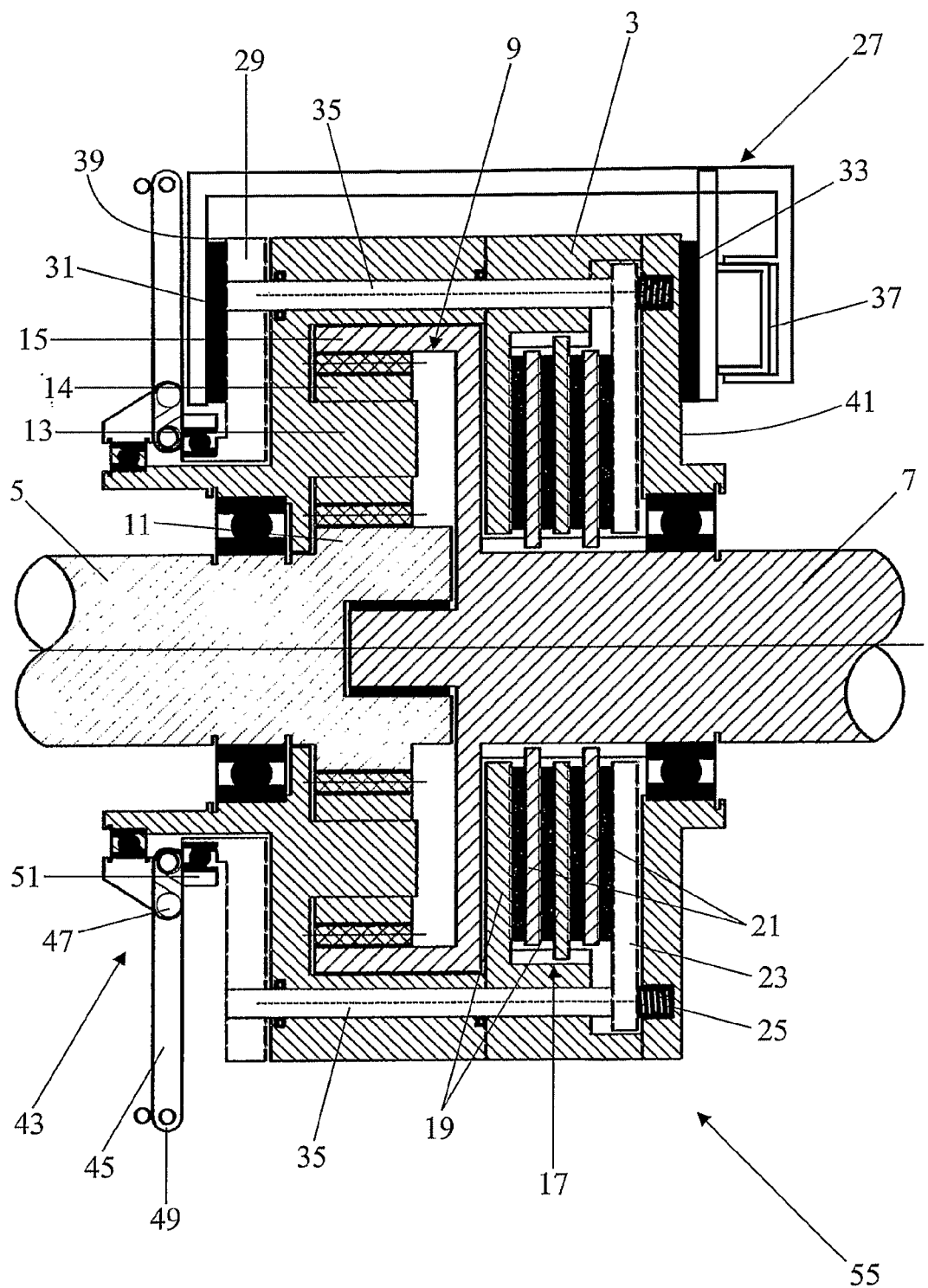
FIG. 3 shows a third embodiment of the transmission according to the invention.

FIGS. 2 and 3 show two further embodiments of the transmission according to the invention, where the planetary gear set 9 is connected to the housing 3 and to the two input/output shafts 5 and 7 in a different manner. In the transmission 53 shown in FIG. 2 the sun gear 11 is fitted to the housing 3, the planet gear support 13 is connected to the first input/output shaft 5 and the annulus gear 15 is connected to the second input/output shaft 7. In the transmission 55 shown in FIG. 3 the sun gear 11 is fitted to the first input/output shaft 5, the planet gear support 13 is fitted to the housing and the annulus gear 15 is connected to the second input/output shaft 7.

Albeit the invention has been described in the foregoing with reference to the drawings, it should be pointed out that the invention is not by any manner or means restricted to the embodiment shown in the drawings. The invention also extends over any embodiment deviating from the embodiment shown in the drawing Figures within the spirit and scope defined by the claims. For example, by adapting the construction the brake pads 31 and 33 can be arranged in an electrically adjustable manner in lieu of a hydraulically adjustable manner.

The invention claimed is:

1. A transmission comprising a first input/output shaft, a second input/output shaft, a planetary gear set comprising three rotatable members of which a first rotatable member is connected to the first input/output shaft and a second rotatable member is connected to the second input/output shaft, which transmission further includes a clutch having a first clutch portion which is connected to one of the rotatable members, a second clutch portion which is connected to another one of the rotatable members and is axially movable relative to the first clutch portion, and an axially movable pressure plate, and which transmission includes a brake with a brake disc that is fixedly attached to the pressure plate and at least one brake pad fixedly connected to the firm object in the direction of rotation of the brake disc and movably connected to the firm object in axial direction of the brake disc, the brake disc being movably connected in axial direction to a third one of the rotatable members and being fixedly connected in the direction of rotation to a third one of the rotatable members, characterised in that the transmission includes a housing in which the planetary gear set and the clutch are arranged while the third rotatable member is attached to the housing.

2. A transmission as claimed in claim 1, wherein the brake disc is situated at a distance from an axial side of the housing, while a brake disc side turned away from the housing forms a braking surface that cooperates with the brake pad and the other axial side of the housing forms a further braking surface, and the brake comprises a further brake pad that cooperates with the further braking surface.

3. A transmission as claimed in claim 1, wherein the transmission comprises disengaging means which are capable of axially displacing the brake disc and thus pushing away the pressure plate of the clutch portions and opening up the clutch.

4. A transmission as claimed in claim 3, wherein the disengaging means comprise a lever that is rotatable around a pivot which is bearing-mounted on the housing, one end of which lever can be operated and the other end is bearing-mounted on the brake disc.

5. A transmission comprising:
a first input/output shaft;
a second input/output shaft;
a planetary gear set comprising three rotatable members, including a first rotatable member connected to the first input/output shaft, and a second rotatable member connected to the second input/output shaft;
a clutch having a first clutch portion which is connected to one of the rotatable members, a second clutch portion which is connected to another one of the rotatable members and is axially movable relative to the first clutch portion, and an axially movable pressure plate;
a brake with a brake disc that is fixedly attached to the pressure plate and at least one brake pad fixedly connected to the firm object in the direction of rotation of the brake disc and movably connected to the firm object in axial direction of the brake disc, the brake disc being movably connected in axial direction to a third one of the rotatable members and being fixedly connected in the direction of rotation to a third one of the rotatable members; and
a housing in which the planetary gear set and the clutch are arranged while the third rotatable member is attached to the housing.

6. A transmission comprising:
a first input/output shaft;
a second input/output shaft;
a planetary gear set comprising three rotatable members, including a first rotatable member connected to the first input/output shaft, and a second rotatable member connected to the second input/output shaft;
a clutch having a first clutch portion which is connected to one of the rotatable members, a second clutch portion which is connected to another one of the rotatable members and is axially movable relative to the first clutch portion, and an axially movable pressure plate;
a brake with a brake disc that is fixedly attached to the pressure plate and at least one brake pad fixedly connected to the firm object in the direction of rotation of the brake disc and movably connected to the firm object in axial direction of the brake disc, the brake disc being movably connected in axial direction to a third one of the rotatable members and being fixedly connected in the direction of rotation to a third one of the rotatable members;
a housing in which the planetary gear set and the clutch are arranged while the third rotatable member is attached to the housing; and
wherein the brake disc is situated at a distance from an axial side of the housing, while a brake disc side turned away from the housing forms a braking surface that cooperates with the brake pad and the other axial side of the housing forms a further braking surface, and the brake comprises a further brake pad that cooperates with the further braking surface.

* * * * *